United States Patent
Mermelstein

(10) Patent No.: US 12,134,827 B2
(45) Date of Patent: Nov. 5, 2024

(54) COMPRESSOR INTEGRATION AND SAFE OPERATION START UP FOR ATMOSPHERIC OPERATION OF SOEC SYSTEMS

(71) Applicant: Bloom Energy Corporation, San Jose, CA (US)

(72) Inventor: Joshua Mermelstein, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/155,989

(22) Filed: Jan. 18, 2023

(65) Prior Publication Data

US 2023/0227984 A1    Jul. 20, 2023

Related U.S. Application Data

(60) Provisional application No. 63/300,617, filed on Jan. 18, 2022.

(51) Int. Cl.
*C25B 9/05* (2021.01)
*C25B 1/02* (2006.01)
(Continued)

(52) U.S. Cl.
CPC .................. *C25B 9/05* (2021.01); *C25B 1/02* (2013.01); *C25B 9/67* (2021.01); *C25B 15/021* (2021.01); *C25B 15/08* (2013.01)

(58) Field of Classification Search
CPC .................................. C25B 1/04; C25B 1/042
(Continued)

(56) References Cited

U.S. PATENT DOCUMENTS 3,680,973 A * 8/1972 Pilarczyk ............ F04D 29/4206
                                                        415/59.1
3,696,588 A * 10/1972 Dussourd .............. B60T 17/004
                                                        96/113
(Continued)

FOREIGN PATENT DOCUMENTS

CN          112619384 A  *  4/2021
EP           2975683 A1      1/2016
(Continued)

OTHER PUBLICATIONS

"Compressor Knock-Out Drum" available online at http://www.biofuelsacademy.org/index.html%3Fp%3D324.html, May 2021, date verified via archive.org (https://web.archive.org/web/20210517003615/http://www.biofuelsacademy.org/index.html%3Fp=324.html) (Year: 2021).*

(Continued)

*Primary Examiner* — Harry D Wilkins, III
(74) *Attorney, Agent, or Firm* — THE MARBURY LAW GROUP PLLC

(57) ABSTRACT

A compressor for a solid oxide electrolyzer cell (SOEC) system, the system including one or more stamps that receives hydrogen input and outputs wet hydrogen, a heat exchanger or condenser that is configured to decrease the temperature of the wet hydrogen, a compressor that is configured to increase the pressure of the wet hydrogen, and a dryer that is configured to reduce the dew point of the wet hydrogen.

14 Claims, 5 Drawing Sheets

(51) Int. Cl.
*C25B 9/67* (2021.01)
*C25B 15/021* (2021.01)
*C25B 15/08* (2006.01)

(58) Field of Classification Search
USPC ........................................................ 205/335
See application file for complete search history.

(56) References Cited

U.S. PATENT DOCUMENTS

| | | | | |
|---|---|---|---|---|
| 3,732,890 | A * | 5/1973 | Smith | F16K 31/363 |
| | | | | 137/519.5 |
| 9,834,846 | B2 | 12/2017 | Mermelstein et al. | |
| 10,026,982 | B2 | 7/2018 | Mermelstein et al. | |
| 10,069,155 | B2 | 9/2018 | Mermelstein | |
| 10,144,641 | B2 | 12/2018 | Mermelstein | |
| 10,770,742 | B2 | 9/2020 | Mermelstein et al. | |
| 2002/0100682 | A1 * | 8/2002 | Kelley | H01M 8/065 |
| | | | | 204/266 |
| 2007/0000789 | A1 * | 1/2007 | Libby | C25B 1/04 |
| | | | | 205/637 |
| 2013/0126360 | A1 * | 5/2013 | Ise | C25B 1/04 |
| | | | | 205/412 |
| 2016/0122882 | A1 * | 5/2016 | Oomura | C25B 9/73 |
| | | | | 205/637 |
| 2016/0369416 | A1 * | 12/2016 | Mermelstein | H01M 8/04291 |
| 2016/0377342 | A1 | 12/2016 | Mermelstein | |
| 2017/0175277 | A1 * | 6/2017 | von Olshausen | C25B 9/05 |
| 2018/0026290 | A1 * | 1/2018 | Mermelstein | H01M 8/186 |
| | | | | 429/418 |
| 2018/0202055 | A1 * | 7/2018 | Reytier | H01M 8/04014 |
| 2018/0287179 | A1 | 10/2018 | Rueger et al. | |
| 2019/0204391 | A1 * | 7/2019 | Cottuli | H01M 8/04365 |
| 2019/0245224 | A1 | 8/2019 | Lacroix et al. | |
| 2020/0343567 | A1 | 10/2020 | Wakita et al. | |
| 2022/0290309 | A1 * | 9/2022 | Wehrman | C25B 9/70 |
| 2022/0349076 | A1 * | 11/2022 | Weingaertner | C25B 1/04 |
| 2023/0046387 | A1 * | 2/2023 | Peschel | C01B 3/34 |

FOREIGN PATENT DOCUMENTS

| | | | | |
|---|---|---|---|---|
| EP | 3048037 | A1 | 7/2016 | |
| EP | 4086370 | A2 | 11/2022 | |
| KR | 20180036859 | A | 4/2018 | |
| KR | 20210095286 | A | 8/2021 | |
| WO | WO-2010121955 | A2 * | 10/2010 | H01M 8/00 |
| WO | WO-2021151453 | A1 * | 8/2021 | B01J 19/245 |

OTHER PUBLICATIONS

Daoutidis et al., Feedforward/Feedback control of multivariable nonlinear processes, AIChE Journal, vol. 36, No. 10, Oct. 1990, pp. 1471-1484 (Year: 1990).*
Machine Translation of Wang et al., CN112619384A (Year: 2021).*
Machine translation of Brodmann et al (WO 2010/121955 A2) (Year: 2010).*
A. Brisse et al., "Solid Oxide Electrolyzer System Operational at the H2 Refueling Station of Karlsruhe", Fuel Cells, Wiley—V C H Verlag GMBH & Co. KGAA, DE, vol. 19, No. 4, Jul. 18, 2019, pp. 408-416, XP072359513, ISSN: 1615-6846, DOI: 10.1002/FUCE. 201800163.
Search Report dated Jul. 24, 2023 issued in corresponding European Application No. 23152226.9.
International Search Report and Written Opinion mailed Apr. 14, 2023 in corresponding PCT Application No. PCT/IB2023/050437.

* cited by examiner

500

COMPRESSOR INTEGRATION AND SAFE OPERATION START UP FOR ATMOSPHERIC OPERATION OF SOEC SYSTEMS

FIELD

The embodiments of the present invention are generally directed toward electrolyzer systems including solid oxide electrolyzer cells (SOEC) and methods of operating the same. In particular, to compressor integration and safe operation start up for atmospheric operation of SOEC systems.

BACKGROUND

Solid oxide fuel cells (SOFC) can be operated as an electrolyzer in order to produce hydrogen and oxygen, referred to as solid oxide electrolyzer cells (SOEC). In SOFC mode, oxide ions are transported from the cathode side (air) to the anode side (fuel) and the driving force is the chemical gradient of partial pressure of oxygen across the electrolyte. In SOEC mode, a positive potential is applied to the air side of the cell and the oxide ions are now transported from the fuel side to the air side. Since the cathode and anode are reversed between SOFC and SOEC (i.e. SOFC cathode is SOEC anode, and SOFC anode is SOEC cathode), the SOFC cathode (SOEC anode) may be referred to as the air electrode, and the SOFC anode (SOEC cathode) may be referred to as the fuel electrode. During SOEC mode, water in the fuel stream is reduced ($H_2O+2e \rightarrow ^{2-}+H_2$) to form $H_2$ gas and $O^{2-}$ ions, $O^{2-}$ ions are transported through the solid electrolyte, and then oxidized on the air side ($O^{2-}$ to $O_2$) to produce molecular oxygen. Since the open circuit voltage for a SOFC operating with air and wet fuel (hydrogen, reformed natural gas) is on the order of 0.9 to 1V (depending on water content), the positive voltage applied to the air side electrode in SOEC mode raises the cell voltage up to typical operating voltages of 1.1 to 1.3V.

SUMMARY

The embodiments of the present invention are directed toward compressor integration and safe operation start up for atmospheric operation of SOEC systems that substantially obviates one or more problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the compressor integration and safe operation start up for atmospheric operation of SOEC systems includes systems, devices, methods, and instructions for operating an SOEC system that implement a recycle flow at the compressor where suction is controlled by a pressure controller, implement a feed and vent globe control valve upstream of the compressor that enables a smooth transition of electrolysis product gas to the compressor, wherein fast acting ball valves on the compressor skid relieve suction line pressure when the compressor is shut down.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the embodiments of the present invention, examples of which are illustrated in the accompanying drawings. It is to be understood that both the foregoing general description and the following detailed description are examples, and are not restrictive of the invention as claimed.

Figure 1:
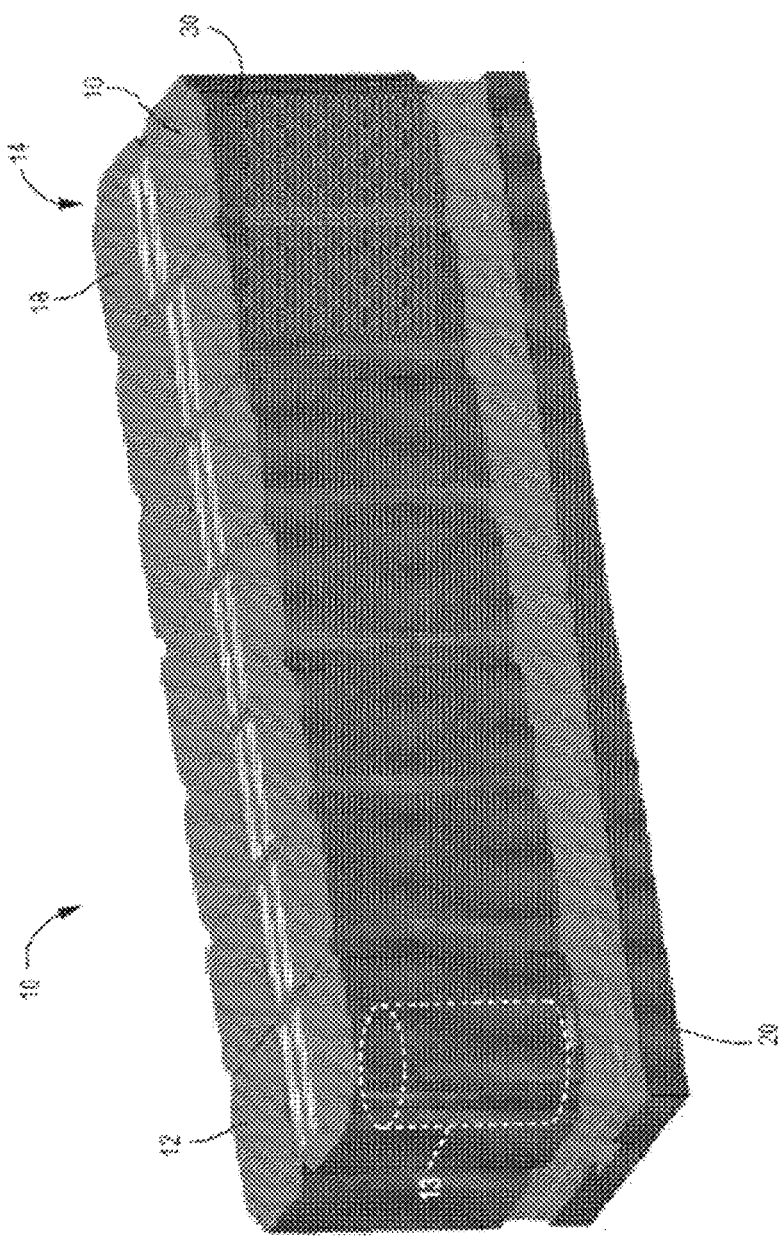
FIG. 1 illustrates a SOFC/SOEC modular system according to an example embodiment of the present invention.

FIG. 1 illustrates a SOFC/SOEC modular system 10 according to an example embodiment of the present invention.

The modular design of the SOFC/SOEC system 10 provides flexible system installation and operation. Modules enable scaling of installed generating capacity, reliable generation of power, flexibility of fuel processing, and flexibility of power output voltages and frequencies with a single design set. The modular design results in an "always on" unit with very high availability and reliability, and also provides an improved means of maintenance and scale-up. The modular design also enables the use of available fuels and required voltages and frequencies that may vary by customer and/or by geographic region.

The SOFC/SOEC modular system 10 includes a housing 14 in which at least one of generator modules 12 (preferably a plurality, generator module 12 also referred to as "SGM"), one or more fuel processing modules 16 (in SOFC systems), and one or more power conditioning modules 18 (i.e., electrical output, also referred to a generator module or "SPM") are disposed. In these example embodiments, the power conditioning modules 18 may include a mechanism to convert DC to AC or AC to DC. For example, the system 10 can include any desired number of modules, such as 2-30 generator modules, 3-12 generator modules, 6-12 modules, or other large site configuration of generator modules.

The example system 10 of FIG. 1 includes any number of generator modules 12 (one row of six modules stacked side to side), one fuel processing module 16 (in SOFC systems), and one power conditioning module 18 on a pad 20. The housing 14 may include a cabinet to house each module 12, 16, 18. Alternatively, modules 16 and 18 may be disposed in a single cabinet. While one row of generator modules 12 is shown, the system may include more than one row of modules 12. For example, the SOFC/SOEC system 10 can include two rows of generator modules 12 arranged back to back/end to end.

Each generator module 12 is configured to house one or more hotboxes 13. Each hotbox 13 contains one or more stacks or columns of fuel/eelectrolyzer cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. also may be used.

The fuel cell stacks may include externally and/or internally manifolded stacks. For example, the stacks may be internally manifolded for fuel and air with fuel and air risers extending through openings in the fuel/electrolyzer cell layers and/or in the interconnect plates between the fuel/electrolyzer cells.

The fuel/electrolyzer cell stacks may be internally manifolded for fuel and externally manifolded for air, where only the fuel inlet and exhaust risers extend through openings in the fuel/electrolyzer cell layers and/or in the interconnect plates between the fuel cells. The fuel/electrolyzer cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

The fuel processing module 16 and the power conditioning module 18 may be housed in one cabinet of the housing 14. As shown in the example embodiment in FIG. 1, one cabinet 14 is provided for one row of six (or any number of) generator modules 12, which are arranged linearly side to side on one side of the input/output module 14. The row of modules may be positioned, for example, adjacent to a building for which the system provides power (e.g., with the backs of the cabinets of the modules facing the building wall).

The linear array of generator modules 12 is readily scaled. For example, more or fewer generator modules 12 may be provided depending on the power needs of the building or other facility serviced by the fuel cell/electrolyzer system 10. The generator modules 12 and input/output modules 14 may also be provided in other ratios. For example, in other exemplary embodiments, more or fewer generator modules 12 may be provided adjacent to the input/output module 14. Further, the support functions could be served by more than one input/output module 14 (e.g., with a separate fuel processing module 16 and power conditioning module 18 cabinets). Additionally, the input/output module 14 is at the end of the row of generator modules 12, it also can be located in the center of a row generator modules 12 or other location.

The SOFC/SOEC modular system 10 may be configured in a way to ease servicing of the components of the system 10. For example, the routinely or high serviced components (such as the consumable components) can be placed in a single module to reduce amount of time required for the service person. For example, a purge gas (optional) may be placed in a single module (e.g., a fuel processing module 16 or a combined input/output module 14 cabinet). This can be the only module cabinet accessed during routine maintenance. Thus, each module 12, 14, 16, and 18 can be serviced, repaired or removed from the system without opening the other module cabinets and without servicing, repairing or removing the other modules. In addition, plumbing and electrical components may be disposed above a steel overlay disposed between the concrete pad and the generator modules 12.

For example, as described above, the system 10 can include multiple generator modules 12. When at least one generator module 12 is taken off line (i.e., no power is generated by the stacks in the hotbox 13 in the off line module 12), the remaining generator modules 12, the fuel processing module 16 and the power conditioning module 18 (or the combined input/output module 14) are not taken off line. Furthermore, the fuel cell/electrolyzer system 10 may contain more than one of each type of module 12, 14, 16, or 18. When at least one module of a particular type is taken off line, the remaining modules of the same type are not taken off line.

Thus, in a system comprising a plurality of modules, each of the modules 12, 14, 16, or 18 may be electrically disconnected, removed from the fuel/electrolzer cell modular system 10 and/or serviced or repaired without stopping an operation of the other modules in the system, allowing the fuel cell system to continue to generate electricity. The entire SOFC/SOEC modular system 10 does not have to be shut down if one stack of fuel cells/electrolyzers in one hot box 13 malfunctions or is taken off line for servicing.

Figure 2:
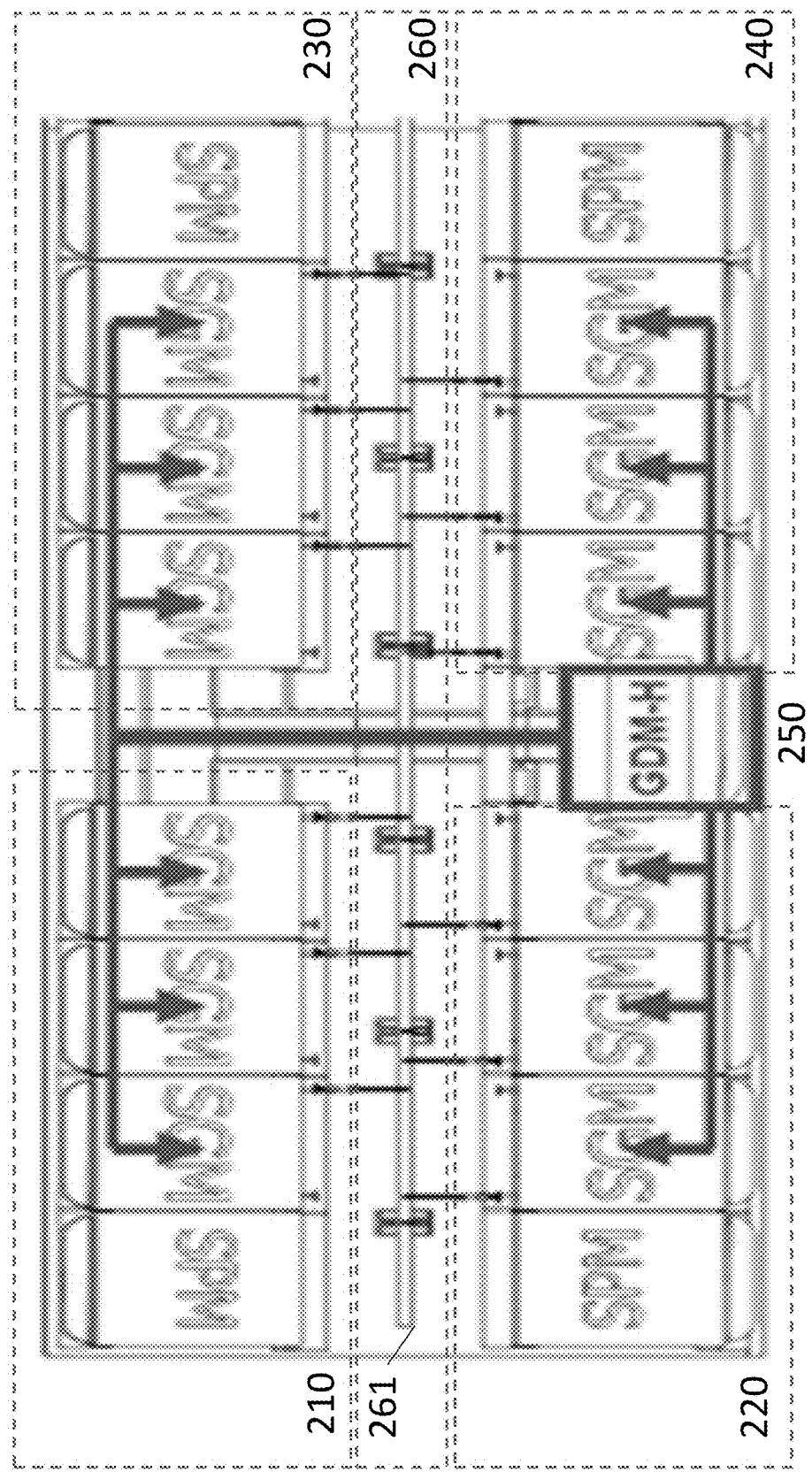
FIG. 2 illustrates a large site electrolyzer system according to an example embodiment of the present invention.

FIG. 2 illustrates a large site electrolyzer system 200 according to an example embodiment of the present invention.

The large-site electrolyzer system 200 includes a gas distribution module ("GDM") 250 that is configured to supply a plurality of modular blocks 210, 220, 230, 240 with start-up hydrogen. SOEC and SOFC systems generally require fresh hydrogen gas for start-up and shutdown. Gas distribution module 250 can further include a pressure detector, thermal detector, a gas safety shutoff, and a purge gas distributor.

As discussed above, each modular block incudes one power module ("SPM") and one or more generator modules ("SGM"), for example. A grouping of modular blocks into a collection of systems is referred to as a stamp. Thus, large site electrolyzer system 200 is a stamp. Because hydrogen is a flammable gas that is supplied to each SGM at pressure, a safe method of shutting off gas to a group of generator modules SGMs is needed if a safety event is detected. Thus, GDM 250 is configured to shut off hydrogen supplied to SGMs in the event that a safety event is detected. Safety designs, such as pressure detection, overpressure protection, and gas safety shutoff are readily applied within electrolyzer system 200 by GDM 250 and/or the fuel processing module (e.g., 16). In addition, a stamp level controller can be provided at GDM 250.

Although the grouping of four modular blocks 210, 220, 230, 240 is an example configuration, this configuration is an efficient grouping for gas safety. In addition, the grouping of four modular blocks 210, 220, 230, 240 is efficient for the collection of hydrogen product within servicing aisle 260. The piping 261 within servicing aisle 260 is configured to collect hydrogen product for integration with a downstream compression system. Piping 261 is configured to prevent condensate backflow into the generator modules SGMs. Condensate management also enables using various monitoring and control devices as well as piping to return to the water outlet (or BOP1).

Figure 3:
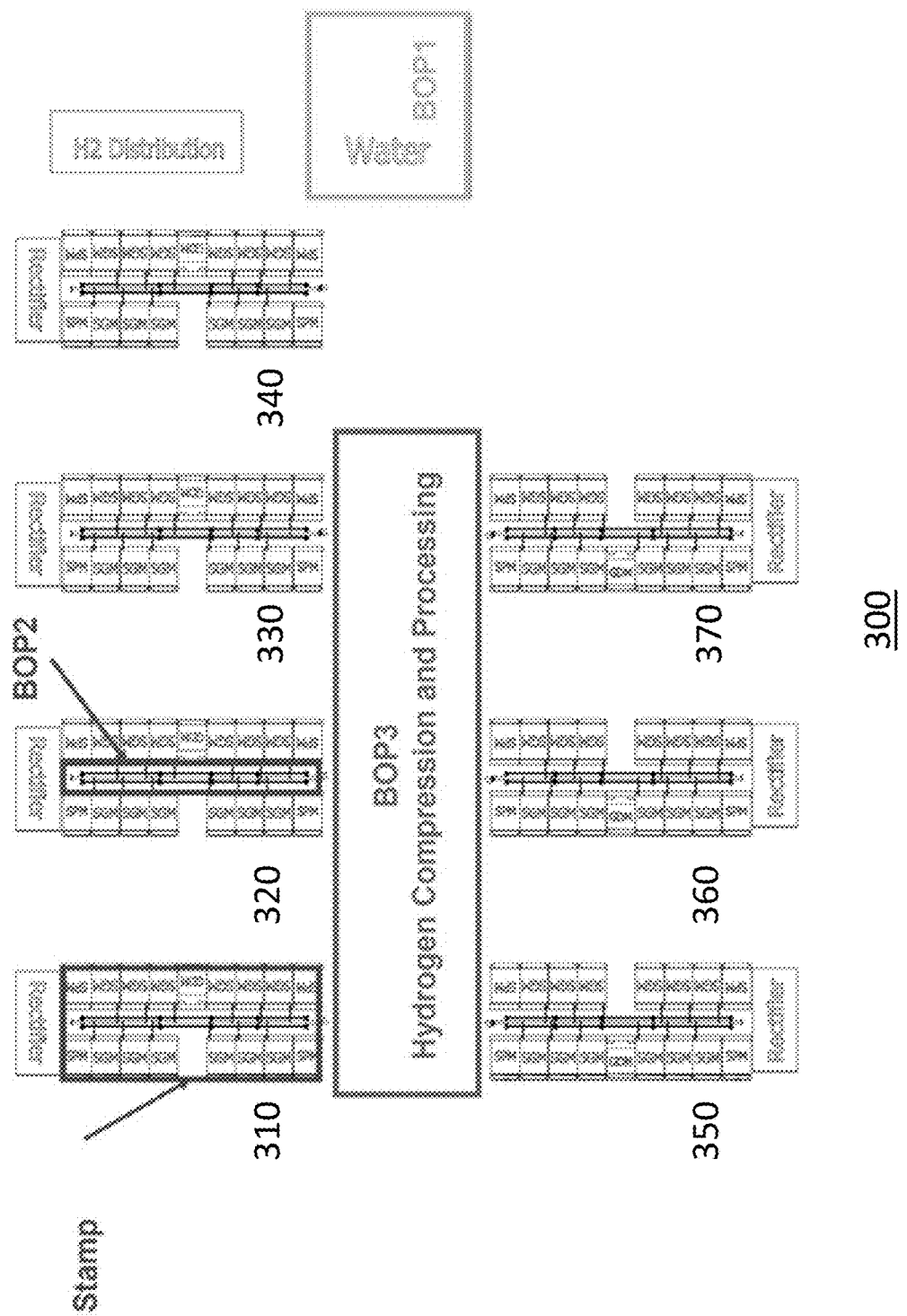
FIG. 3 illustrates a large site electrolyzer system according to another example embodiment of the present invention.

FIG. 3 illustrates a large site (e.g., a 10-megawatt system) electrolyzer system 300 according to an example embodiment of the present invention. As illustrated in FIG. 3, electrolyzer system 300 includes a plurality of stamps 310, 320, 330, 340, 350, 360, and 370. In addition, electrolyzer system 700 further includes additional balance of plant components, such as water source BOP1, hydrogen product collectors BOP2 (e.g., including piping 261), and hydrogen compression and processing BOP3. Hydrogen compression and processing BOP3 is functionally configured to supply hydrogen at pressure to the gas distribution module (e.g., GDM 250) of each respective stamp 310, 320, 330, 340, 350, 360, and 370. Thus, the stamp architecture can be repeated in a large site layout, using the repeated elements to build up to a large site installation.

Figure 4:
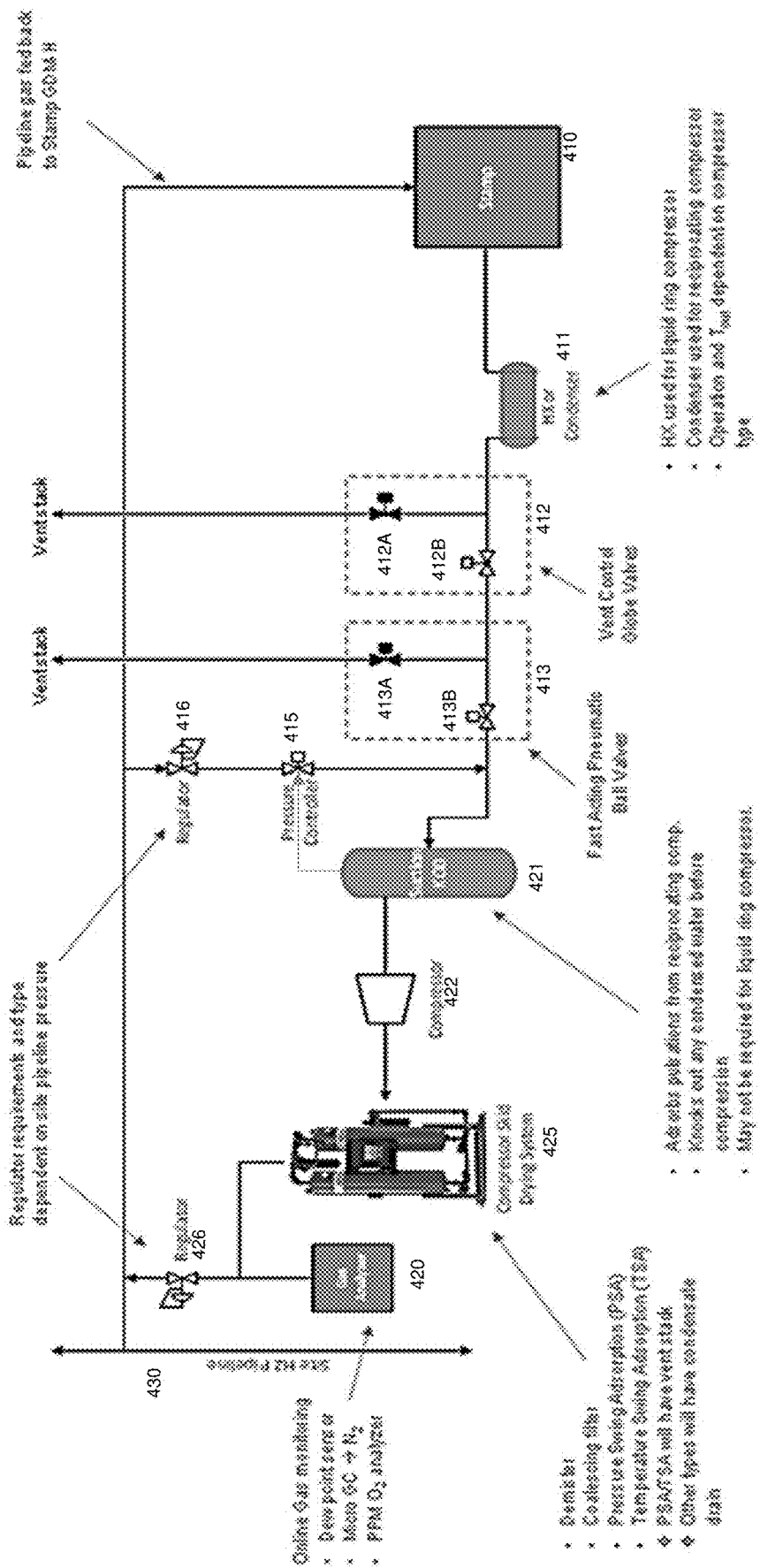
FIG. 4 illustrates a compressor system according to an example embodiment of the present invention.

FIG. 4 illustrates a compressor system 400 according to an example embodiment of the present invention.

As illustrated in FIG. 4, compressor system 400 includes one or more stamps 410 being supplied with hydrogen by manifold 430 (e.g., a product manifold for a site, or coupled to stored hydrogen). For example, the hydrogen can be supplied to a gas distribution module (e.g., GDM 250 of FIG. 2) of the one or more stamps 410. Compressor system 400 further includes a closed feedback loop from the one or more stamps 410 through heat exchanger or condenser 411, transition valves 412, isolation valves 413, suction knockout drum 421, compressor 422, compressor skid drying system 425 (e.g., dryer), and gas analyzer 420. In the various configurations, there may be one compressor 422 per stamp, or one compressor 422 for multiple stamps 410.

One or more stamps 410 supply wet hydrogen (e.g., a combination of steam and hydrogen) to heat exchanger or condenser 411. Heat exchanger or condenser 411 reduces the temperature of the output of the one or more stamps 410 to a temperature suitable for the suction of compressor 422 (e.g., cools by between 40° C. and 80° C. such that 150° C. at stamp output is cooled to between 70° C. and 110° C.). In some cases, product temperature supplied to compressor 422 can be as high as 230° C.

Transition valves 412 are used to bring one or more stamps 410 and compressor 422 to full operation. Before compressor 422 is fully operational and while one or more stamps 410 is fully operational, the output of condenser 411 is vented by opening transition valve 412A. Once compressor 422 becomes fully operational, at 100% recycle, the output of condenser 411 supplied to suction knockout drum 421 by opening transition valve 412B and closing transition valve 412A.

Isolation valves 413 (e.g., fast acting pneumatic ball valves) are used if a fault event occurs (e.g., excess pressure is detected). For example, isolation valve 413A can be opened if excess pressure is detected. Isolation valve 413B is opened during operation of compressor 422. Accordingly, excess pressure does not feedback to the one or more stamps 410 which can be damaged due to excess pressure build up.

Suction knockout drum 421, is configured to collect and discard any condensate that has formed via a condensate discharge line (not shown). Suction knockout drum 421 also is configured to regulate any pressure fluctuations.

The compressed (i.e., having increased pressure) output of compressor 422 is further dried by compressor skid drying system 425. Gas analyzer 420 monitors and controls output (i.e., the dried gas) of compressor skid drying system 425 to maintain a target dew point, target nitrogen content, and/or target oxygen content. For example, gas analyzer 420 can be configured to include a dew point sensor and one or more gas chromatographs. Gas analyzer 420 ensures that output (i.e., the dried gas) of compressor skid drying system 425 meets one or more purity requirements (e.g., moisture and gas content) before being supplied to manifold 430 (e.g., customer product line). Gas analyzer 420 can adjust the dew point (i.e., moisture) by controlling compressor skid drying system 425. However, if one or more impurities (e.g., nitrogen or oxygen) exceed respective thresholds, a warning signal or shutdown signal can be sent to a system controller (not shown).

Regulator 426 is a back pressure regulator. When system 400 is started, a minimum pressure is needed against the compressor 422 and compressor skid drying system 425. Otherwise, compressor 422 and compressor skid drying system 425 may be slow to generate sufficient pressure for operation. Regulator 416 is a forward pressure regulator. At regulator 416, compressed product can have a wide range of pressure between (e.g., 5 PSI and 10,000 PSI). Before being supplied to pressure controller 415, pressure output from regulator 416 is adjusted (e.g., to less than 100 mbar). Pressure controller 415 is configured to maintain pressure at suction knockout drum 421 by measuring pressure at suction knockout drum 421 and maintaining pressure at the feed to suction knockout drum 421 at (e.g., less than 100 mbar). In some embodiments, suction knockout drum 421 is optional.

Accordingly, the various embodiments of the present invention are directed toward integration and controls startup of a compressor system with a SOEC system generating hydrogen.

In operation, operating SOEC systems produce hydrogen at very low pressures, such as at atmospheric pressure or at just above ambient conditions (e.g., approximately 40 mbar). Due to the low pressure, minor fluctuations in downstream processing, such as turning on a compressor or switching valves, can cause an immediate pressure/vacuum surge that risks failure to the SOEC stacks. Accordingly, the various embodiments provide techniques that enable a compressor to turn on without creating such a surge, enable a smooth transition to the compressor, and provide a safe means of transitioning from compression to vent under shutdown conditions.

Others have used a pressure switch to activate turning on the compressor. Here, product hydrogen is supplied to the compressor suction. When a pressure threshold is met, the compressor turns on. This has been used in low temperature PEM and alkaline systems that have fast response from cold start conditions and can react quickly to pressure fluctuations from starting a compressor. SOEC systems generally are slower, and the embodiments utilize unreacted steam at start-up to prevent a pressure spike or vacuum at the compressor.

Others have used large inverted buckets as a means to balance pressure with the above pressure switch concept. This introduces a potential for an open system where hydrogen and air could mix. The inverted bucket also is very large and would take up considerable foot print.

In the various embodiments, the drawbacks of known techniques are solved. First, implementing a 100% recycle flow at compressor 422 where suction is controlled by pressure controller 415. Pressure controller 415 maintains a set suction pressure to compressor 422 independent of the electrolysis hydrogen flow rate. Second, implementing transition valves 412 (e.g., a feed and vent globe control valve) upstream of compressor 422 that enables a smooth transition of electrolysis product gas to compressor 422. Third, utilizing isolation valves 413 (e.g., fast acting ball valves) on the compressor skid to (immediately, e.g., within less than two or three seconds) relieve suction line pressure when compressor 422 is shut down or a fault event occurs.

The embodiments are different than known techniques by enabling the SOEC system to stabilize before turning on the compressor. In addition, stack sensitivity issues to pressure surges that could occur from the compressor unit starting up or shutting down are prevented.

Figure 5:
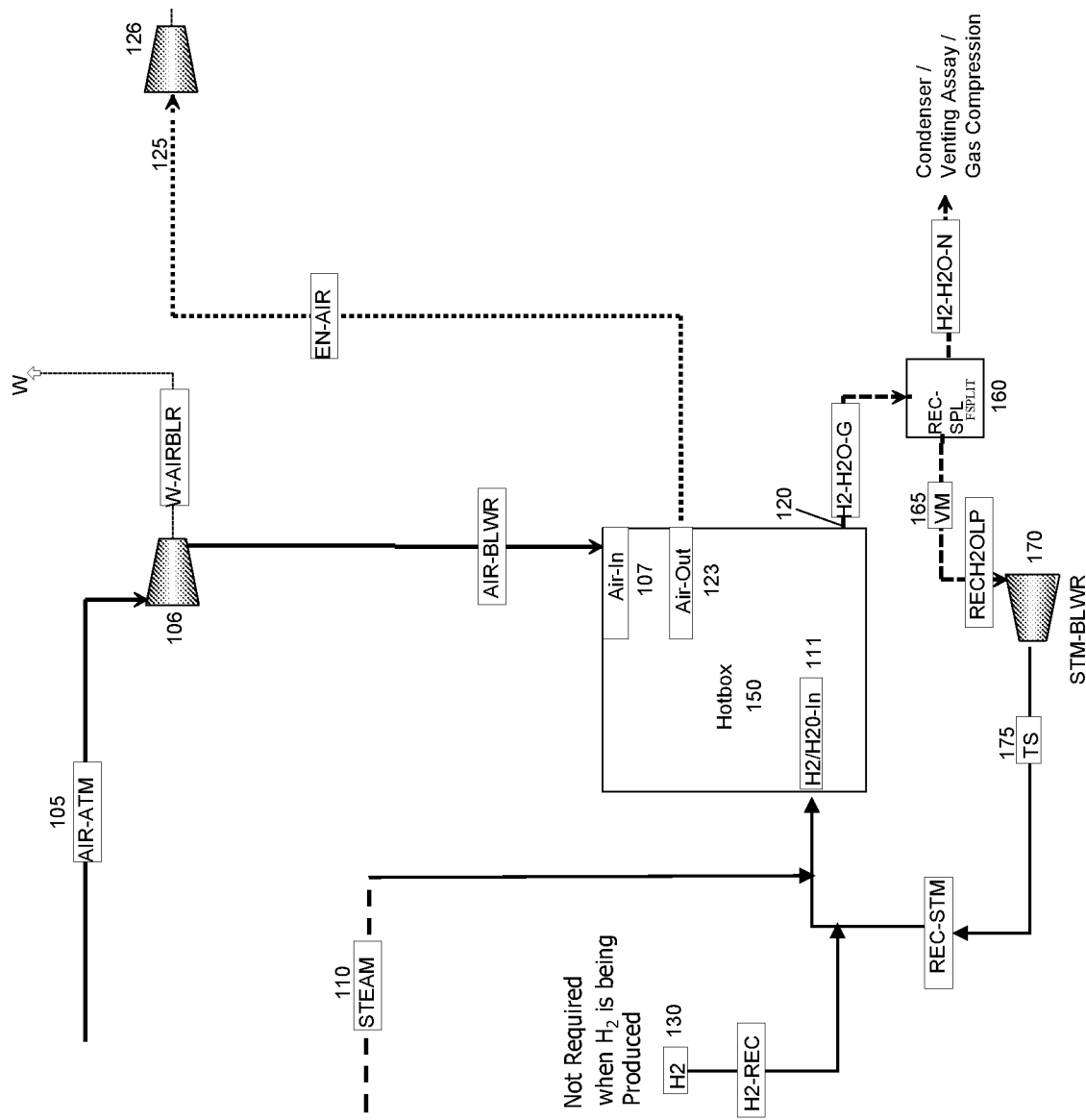
FIG. 5 illustrates an SOEC system according to an example embodiment of the present invention.

FIG. 5 illustrates an SOEC system 500 according to an example embodiment of the present invention.

As illustrated in FIG. 5, SOEC system 100 includes air conduit 105, air blower 106, air inlet 107, steam conduit 110, recycle steam inlet 111, hotbox 150, optional hydrogen conduit 130, enriched air outlet 123, enriched air conduit 125, enriched air blower 126, steam and hydrogen product outlet 120, splitter 160, Venturi flow meter 165, steam recycle blower 170, and thermal sensor 175.

According to an example configuration and operation, steam input at steam conduit 110 (e.g., supplying site or facility steam at varying pressures) can have a temperature of between about 100° C. and 110° C. (e.g., 105° C.) and a pressure of about 1 psig. In the various embodiments, steam may be input to the SOEC system 500 from an external source or may be generated locally. In some embodiments, multiple steam inlets may be configured to receive external and local steam, respectively. Alternatively, or additionally, water may be input to the SOEC system 500 and vaporized.

Air input (e.g., ambient air) at air conduit 105 may be ambient temperature, perhaps between about −20° C. and +45° C., at the local atmospheric pressure. Air from air conduit 105 is received at air blower 106, and air output by air blower 106 will be a slightly higher temperature than ambient due to the heat of compression. For example, the temperature of air output by air blower 106 may be about 30° C. at 1.0 psig as compared to 20° C. ambient air temperature. Air input of air conduit 105 is then received at air inlet 107 of hotbox 150.

Hydrogen from optional hydrogen conduit 130 may only be required for startup and transients when hydrogen is not being otherwise produced by SOEC system 500. For example, there is no longer a need for a separate hydrogen feed stream or hydrogen recycle steam at steady state. Pressure for this hydrogen stream is a design option determined at the time of site construction, and may be between about 5 psig and 3000 psig. The temperature is likely to be near ambient, as it is likely to be coming from storage.

Air input at air conduit 105, steam input at steam conduit 110, and hydrogen input at optional hydrogen conduit 130 are input to hotbox 150. In turn, hotbox 150 outputs steam and hydrogen product $H_2$-$H_2O$-G at steam and hydrogen product outlet 120 of hotbox 150, where G stands for Gross. Hotbox output $H_2$-$H_2O$-G may have a temperature between about 500° C. and 180° C. (e.g., 130° C.), a pressure of between about 0.1 and 0.5 psig.

In addition, hotbox output H2-H2O-G is input to splitter 160 and is split into a steam recycle stream RECH2OLP, where LP stands for low pressure, and a net product H2-H2O—N, where N stands for Net (e.g., output for commercial use or storage). Here, net product H2-H2O—N may have a temperature between about 100° C. and 180° C. (e.g., 130° C.), a pressure of between about 0.1 psig and 0.5 psig. Steam recycle stream RECH2OLP may have a temperature of between about 100° C. and 180° C. (e.g., 130° C.), a pressure of between about 0.1 psig and 0.5 psig. Hotbox 150 may further output enriched air at enriched air outlet 123 via enriched air conduit 125 that may have a temperature of between about 120° C. and 300° C., at essentially local atmospheric pressure (e.g., less than 0.5 psig or less than 0.05 psig).

Steam recycle stream RECH2OLP is input to steam recycle blower 170. The resulting recycled steam REC-STM may have a temperature of between about 100° C. and 180° C. (e.g., 140° C., 154° C.), a pressure between about 0.5 and 1.5 psig (e.g., about 1 psig), and is input into hotbox 150 at recycle steam inlet 111. In some embodiments, there may be no recycled hydrogen feed included with the recycled steam.

As can be understood from FIG. 5, incoming steam temperature at steam conduit 110 (e.g., 105° C.) is low compared with a SOEC configuration with internal steam generation. In various configurations, a plurality of recycle loops can be configured to SOEC systems using both internal steam generation and external steam generation. As shown, recycle steam inlet 111 is configured to receive steam from steam conduit 110. Here, the embodiments optionally route the facility supplied steam from steam conduit 110, typically saturated and at a temperature of about 105° C., through the internal steam generation coils, one or more vaporizers, and/or other heating elements, and use the air exhaust heat (e.g., ~280° C.) to further heat (i.e., superheat) the steam supply before the heat is released at enriched air conduit 125 through optional fan or enriched air blower 126.

In some embodiments, a customer (e.g., user, operator, computer thereof) is enabled to control the solid oxide electrolyzer cell (SOEC) system. One or more interfaces provide a custom communications protocol (e.g., via Ethernet, Internet, hard-wired, etc.) to receive and execute customer commands to operate the different states of the SOEC. Accordingly, the embodiments provide support to meet the customer needs for utilizing renewable hydrogen while guaranteeing a safe operation of the SOEC.

For example, the embodiments enable the customer or other third parties to control the SOEC system using parameters such as hydrogen generation, power limitations, and steam available. In some embodiments, a system is provided that is able to go to a safe standby state in case of communication loss. Further, a safe standby state can be defined based on conditions as agreed with the customer.

Additionally, or alternatively, the embodiments provide one or more mechanisms the for customer to operate the SOEC system, provide safety logic to remain within safety limits of the operation, guarantee that hydrogen generation meets the customer needs, by means of enabling hydrogen production ramping. In some instances, the customer can receive advanced notice of upcoming site limitations (e.g., external hydrogen not available, available power schedule, limited communication to power storage, water and input hydrogen storage limitations, etc.). Accordingly, the customer can adjust to such limitations (e.g., adjust hydrogen generation based on hydrogen usage or hydrogen storage limitations at the site).

It will be apparent to those skilled in the art that various modifications and variations can be made in the Compressor integration and safe operation start up for atmospheric operation of SOEC systems of the present invention without departing from the spirit or scope of the invention. Thus, it is intended that the present invention cover the modifications and variations of this invention provided they come within the scope of the appended claims and their equivalents.

What is claimed is:

1. A solid oxide electrolyzer cell (SOEC) system comprising:
generator modules comprising stacks of electrolyzer cells and that receive steam and output a hydrogen product comprising hydrogen and steam;
a heat exchanger or condenser configured to cool the hydrogen product output from the generator modules;
a compressor configured to pressurize the hydrogen product output from the heat exchanger or condenser;
a dryer configured to reduce a dew point of the hydrogen product output from the compressor;

transition valves-configured to control an amount of the hydrogen product output from the generator modules that is vented and an amount of the hydrogen product output from the generator modules that is provided to the compressor, based on an operating state of the compressor; and isolation valves configured to relieve suction line pressure between the compressor and the generator modules in response to a fault event of the compressor, wherein the transition valves comprise:
    a first globe valve configured to control venting of the hydrogen product; and
    a second globe valve configured to control flow of the hydrogen product from the heat exchanger or condenser to the compressor, and wherein the isolation valves comprise:
    a first pneumatic valve configured to control venting of the hydrogen product; and
    a second pneumatic valve configured to control flow of the hydrogen product from the heat exchanger or condenser to the compressor.

2. The system of claim 1, further comprising a suction knockout drum configured to maintain the pressure of the hydrogen product provided to the compressor.

3. The system of claim 2, wherein the suction knockout drum is configured to remove water from the hydrogen product.

4. The system of claim 1, wherein when the compressor is less than fully operational and the generator modules are fully operational, the system is configured to open the first globe valve to vent the hydrogen product.

5. The system of claim 1, wherein when the compressor and the generator modules are fully operational, the system is configured to close the first globe valve and open the second globe valve, such that all of the hydrogen product is supplied to the compressor.

6. The system of claim 1, further comprising a gas analyzer configured to detect the composition of the hydrogen product output from the dryer.

7. The system of claim 6, wherein the gas analyzer is configured to control the operation of the dryer, based on the detected composition.

8. The system of claim 1, further comprising a manifold configured to supply hydrogen to the generator modules.

9. A method for operating a solid oxide electrolyzer cell (SOEC) system, comprising:
    operating generator modules comprising stacks of electrolyzer cells to generate a hydrogen product comprising hydrogen and steam;
    cooling the hydrogen product in a heat exchanger or condenser to generate a cooled hydrogen product;
    compressing the cooled hydrogen product output from the heat exchanger or condenser in a compressor to generate a compressed hydrogen product;
    drying the compressed hydrogen product output from the compressor in a dryer to generate a dried hydrogen product;
    actuating isolation valves to relieve suction line pressure between the compressor and the generator modules in response to a fault event of the compressor; and
    actuating transition valves to control an amount of the cooled hydrogen product that is vented and an amount of the cooled hydrogen product that is provided to the compressor, based on an operating state of the compressor or an operating state of the generator modules, wherein the transition valves comprise:
    a first globe valve configured to control venting of the hydrogen product; and
    a second globe valve configured to control flow of the hydrogen product from the heat exchanger or condenser to the compressor, and wherein the isolation valves comprise:
    a first pneumatic valve configured to control venting of the hydrogen product; and
    a second pneumatic valve configured to control flow of the hydrogen product from the heat exchanger or condenser to the compressor.

10. The method of claim 9, further comprising providing hydrogen to the generator modules during startup and shutdown of the generator modules.

11. The method of claim 9, further comprising maintaining the pressure of the cooled hydrogen product provided to the compressor using a suction knockout drum.

12. The method of claim 11, further comprising providing a regulated flow of the cooled hydrogen product to the suction knockout drum.

13. The method of claim 9, further comprising:
    detecting the composition of the dried hydrogen product output from the dryer; and
    controlling the dryer based on the detected composition.

14. The method of claim 9, wherein the isolation valves are actuated to relieve the suction line pressure between the compressor and the generator modules within three seconds of the fault event of the compressor.

* * * * *